United States Patent [19]
Dickinson

[11] Patent Number: 5,961,389
[45] Date of Patent: Oct. 5, 1999

[54] SPORT AND RECREATIONAL SURFACE

[76] Inventor: Michael W. Dickinson, 100 Piney Creek Ln., North East, Md. 21901

[21] Appl. No.: 09/121,158

[22] Filed: Jul. 23, 1998

Related U.S. Application Data

[60] Provisional application No. 60/053,896, Jul. 28, 1997.

[51] Int. Cl.⁶ .............. B32B 5/16; C09K 17/40; E02D 3/12
[52] U.S. Cl. ............ 472/92; 405/264; 106/272; 428/17; 428/90
[58] Field of Search ............... 472/92; 405/264; 428/17, 90; 106/272

[56] References Cited

U.S. PATENT DOCUMENTS

| | | | |
|---|---|---|---|
| 4,337,283 | 6/1982 | Hass, Jr. | 428/17 |
| 4,501,420 | 2/1985 | Dury | 272/3 |
| 4,790,691 | 12/1988 | Freed | 405/263 |
| 4,819,933 | 4/1989 | Armond | 272/3 |
| 4,867,614 | 9/1989 | Freed | 405/263 |
| 4,925,493 | 5/1990 | Lamoreaux | 106/272 |
| 5,014,462 | 5/1991 | Malmgren et al. | 47/1.01 |
| 5,041,320 | 8/1991 | Meredith et al. | 428/87 |
| 5,326,192 | 7/1994 | Freed | 405/258 |
| 5,711,795 | 1/1998 | Browning | 106/271 |

*Primary Examiner*—David Brunsman
*Attorney, Agent, or Firm*—Connolly Bove Lodge & Hutz LLP

[57] ABSTRACT

A recreational and sport surface which contains a particulate composition containing an intimate mixture of sand, polyolefin fibers, polyolefin particles, tire fibers and a coating of wax on the ingredients of the composition. The surface is preferably placed over a crushed aggregate layer which provides drainage to an area and may also contain a separator layer to prevent the passage of particulate material from the composition.

20 Claims, No Drawings

SPORT AND RECREATIONAL SURFACE

CROSS-REFERENCE TO RELATED APPLICATION

This application is based upon provisional application Ser. No. 60/053,896, filed on Jul. 28, 1997.

BACKGROUND OF THE INVENTION

1. Field of the Invention

The present invention relates to a loose, particulate mixture which can be applied over an easily drained underlayer to provide an outstanding sport and recreational surface. More specifically, the invention provides running, walking and jumping surfaces particularly suited for use in racetracks, exercise areas, and equestrian performance or training rings for horses and ponies. The present invention can also be used in jogging trails, paths and running areas for humans, dogs, automobiles, motorcycles and the like.

2. Description of Related Art

There are numerous artificial surfaces on the market. For instance, U.S. Pat. No. 5,326,192 to Freed, which is hereby incorporated in its entirety by reference, teaches a method of improving a turf surface by adding about 0.1 to 0.5 percent by weight of synthetic fibers into areas that contain turf or soil such that the synthetic fibers anchor the turf beneath the surface and mix with the turf above the surface. Similarly, Freed has invented two other soil reinforcement methods; U.S. Pat. Nos. 4,790,691 and 4,867,614, both to Freed, which are hereby incorporated in their entirety by reference, disclose the reinforcement of soil by mixing together soil and about 0.1 to 0.5 percent by weight of man-made fiber forming substances and/or fiberglass ('614) or thermoplastic polymers and/or fiberglass ('691).

U.S. Pat. No. 4,501,420 to Dury, which is hereby incorporated in its entirety by reference, discloses a method of making a sport surface by laying at least one flexible, water-permeable material containing sand on a water-permeable surface and placing a sheet or resilient material on top of it.

U.S. Pat. No. 4,819,933 to Armond, which is hereby incorporated in its entirety by reference, discloses a sport surface comprising a layer of sand mixed with less than 1.0% by weight of long synthetic fibers, which is laid on top of a prepared drainage base. The Armond surface requires copious amounts of water on a frequent basis in order to prevent the surface from drying out and becoming hard and non-resilient.

U.S. Pat. No. 5,014,462 to Malmgren et al., which is hereby incorporated in its entirety by reference, discloses a method of preparing soil to improve its porosity and reduce it from being compacted. The method comprises loosening the top layer of soil and mixing at least about 10% by volume of solid rubber particles and grass seed into the soil layer.

U.S. Pat. No. 5,041,320 to Meredith et al., which is hereby incorporated in its entirety by reference, teaches a sport surface which comprises a pile fabric and a layer of rubber coated mineral grains (e.g., sand) in which the pile is partly submerged.

U.S. Pat. No. 4,337,283 to Haas, Jr., which is hereby incorporated in its entirety by reference, discloses a synthetic turf playing surface which comprises a subsurface layer (e.g., concrete, clay, dirt, etc.), a moisture barrier layer, a pile fabric layer and a compacted top-dressing layer.

Notwithstanding the aforementioned advancements in sport surfacing, there remains a need for a sport and recreational surface which is stable, water-resistant, easily drained, easily and inexpensively manufactured, resistant to compaction, and hard enough to provide resistance, yet resilient enough to also provide a cushion.

Accordingly, it is an object of the present invention to provide a sport and recreational surface which improves over the prior art surfacing compositions.

It is a further object of the present invention to provide a sport surface which is resistant to compaction and water retention such as to increase the availability of the surface to be safely used by athletes and horses.

It is yet another object of the present invention to provide a sport surface having good shock absorption.

It is still another object of the present invention to provide a sport surface which can be easily and inexpensively prepared and maintained, and which has a longer service life than conventional artificial surfaces.

It is yet a further object of the present invention to provide a sport surface which utilizes environmentally friendly materials, such as scrap rubber tire parts.

It is also an object of the present invention to improve the appearance and performance characteristics of turf surfaces.

It is still another object the present invention to provide a sport surface which may be prepared over a variety of surfaces including cement, dirt, clay, turf and the like.

These and other objects of the present invention can be appreciated by referring to the following description and claims.

SUMMARY OF THE INVENTION

The present invention provides an environmentally safe, non-toxic, and non-irritating sport and recreational surface. More particularly, the present invention creates an ideal equestrian footing which reduces shock and provides cushioning to the feet of running and jumping horses, while still providing sufficient resistance to their rear legs so that they may increase and maintain their speed. The surface is stable, non-slip, dust-resistant, water-resistant and easily drained. Unlike natural track surfaces, the compositions of the present invention require minimal irrigation, thereby reducing the cost of water, machinery and manpower resources. Furthermore, the surface requires relatively little maintenance such as grading and harrowing. Moreover, the surface disclosed herein will be available for use more often than conventional surfaces during the rainy season. Also, the excellent drainage properties reduce the likelihood of injuries to athletes or animals who run on the surface.

The ingredients employed in the compositions of the instant invention are low cost, natural (e.g., sand) and/or synthetic (e.g., polymeric) materials. A major part of preferred compositions comprise recycled plastic such as casings from wire and cable, and from automobile and truck tires. Thus, the invention not only provides an outstanding surface for sport and recreational uses, but also supplies an outlet for recycled plastic products that might otherwise pollute the environment and/or overburden the landfills.

The present invention comprises sand, a hydrocarbon wax and at least one material selected from one or more of the following three classes of ingredients: (i) polyolefin fibers, polyvinyl chloride fibers, wood or a mixture thereof, (ii) polyolefin particles; and (iii) tire fibers, tire cord or a mixture thereof According to a preferred embodiment, sand, chopped fibers of synthetic polymers, plastic polymer particles and tire fibers or cord are intimately mixed, essentially in a dry state, and substantially uniformly coated with a thin film of hydrocarbon wax. Preferably, the synthetic polymers include low and high density polypropylene and the plastic polymer particles include low and high density polyethylene. The ingredients are essentially dry and may be mixed in any suitable manner consistent with the amount of surface material desired such as in a blacktop plant, a cement mixer, or a cattle feed mixer. The specific ingredients are chosen such that the final composition is weather resistant and long lasting, and resistant to degradation when exposed to the conditions of normal outdoor use.

A fuller understanding of the invention will be had by referring to the following description of the preferred embodiments.

DESCRIPTION OF THE PREFERRED EMBODIMENTS

The present invention preferably comprises a particulate composition for use as a sport or recreational surface comprising:

A. about 40–86 percent by weight of sand,

B. about 5–20 percent by weight of a hydrocarbon wax, and

C. about 5–50 percent by weight of one or more of the following ingredients: a fiber, wood, particle, and/or cord, for example, one or more ingredients selected from one or more of the following three classes of ingredients: (i) about 3–15 percent by weight of polyolefin fibers, polyvinyl chloride fibers, wood, or a mixture thereof, (ii) about 7.5–22.5 percent by weight of polyolefin particles, and (iii) about 7.5–22.5 percent by weight of tire fibers, tire cord, or a mixture thereof. Preferably, a mixture of materials from two classes of ingredients of item C are used. Most preferably, materials from all three classes of ingredients of item C are utilized.

Sand, polyolefin fiber, polyolefin particles and tire fiber are added and mixed together in a mixer. All of the ingredients are essentially dry solids. The intimate dry mixture is then mixed with a suitable hydrocarbon wax such as paraffin wax or a mixture of waxes. These waxes are readily available from a variety of commercial sources. They usually comprise high molecular weight materials and are preferably mineral waxes derived from petroleum by-products, for example, dewaxing light lubricating oil stocks (e.g., paraffin waxes). The wax is first heated to liquify it and the melted wax is coated in a substantially uniform layer over each ingredient. The coating is typically achieved by spraying the melted wax over the essentially dry mixture as it is being stirred or tumbled in a suitable mixer, for example, in the same mixer used initially to intimately mix the essentially dry ingredients.

The wax can be of any suitable nature provided that it has a sufficiently high enough melting point. The wax is chosen to have a relatively high melting point such that it does not melt or soften to any substantial extent during use, keeping in mind that under summer conditions the sport or recreational surface may reach temperatures well in excess of 100° F. Accordingly, the melting point of the wax should be in excess of 120° F. and under some circumstances above 170° F. Generally, most waxes do not have a sharply defined melting point, but rather, melt over a range of 10 to 30° F. In any event, the melting point must be sufficiently high such that the sport or recreational surface will not become sticky and the particulate material will not unduly clump and/or stick together when cooled. The wax coating serves to seal and protect the particulate materials from environmental influences and to impart a degree of slip so that the desired cushioning is achieved when initially cooled after coating. The coated particulate material of this invention may solidity into lumps or clumps, but these solids are easily broken up by hand or with a powered mixer. Once broken up, the finished mixture will retain its particulate nature.

The compositions of the present invention are advantageously laid down on the ground over a layer of material that will provide good drainage. While the surface may be laid over practically any type of surface, for example, cement, dirt, clay and turf, it is preferable to lay it over cement or dirt to maximize the drainage benefits of the present invention. Most preferably, it is laid over cement. In use, rain or irrigation water will quickly penetrate and drain through the composition. This is a necessary characteristic, and to be certain that the water will completely drain through the mixture, an aggregate layer or other underlayment of, for example, crushed or broken gravel, stone, or other aggregate (e.g., quarry, granite or limestone fines or dust), or a mixture thereof, is desired. To provide enhanced drainage functions, the underlayer should have a depth of about 3–4 inches and be full of 1–4 inches of aggregate, such as crushed washed stone which is ¼ to 2 inches in diameter. Most preferably, the underlayer will be at least 6 inches deep and contain at least 4 inches of crushed washed stone. Advantageously, a pipe will be laid down with the crushed stone to facilitate rapid egress of any water. The size and uniformity of the drainage underlayer are not critical so long as drainage is accomplished and the particulate mixture of the invention does not significantly penetrate the drainage layer.

The drainage underlayer preferably occupies the same linear dimensions in width and length as the sport surface. However, it is contemplated that the underlayer may be longer, shorter, wider, or thinner than the sport surface so long as the function of drainage is not significantly compromised. The composition is ideally spread over the drainage underlayer to a suitable depth of at least 4 inches, and preferably at least 5 to 6 inches. The thickness may be increased beyond these limits, but considerations of increased cost versus diminution of enhanced benefits impose practical limits on thickness. The compositions of the present invention can be used for long periods of time, for example, up to about 4 to 5 years, but eventually they will break down and require replacement or refurbishing. Usually, the wax, and not the particulate materials, degrade and the original particles can simply be recoated with wax in a suitable mixing device.

Preferably, a water-permeable separator layer, such as a suitable textile, net mesh, other porous membrane layer, or a mixture thereof will be interposed between the sport surface and the drainage layer. The separator layer may be natural or synthetic. In a preferred embodiment of the present invention, a metal screen or a Geotextile membrane separates the particulate materials of the invention, especially the sand, from the drainage materials (e.g., crushed stone). Covering the crushed stone with a porous membrane will prevent the intermixing of the surface layer with the drainage area. Without a separator layer, the sand content of the surface layer may ultimately leach into the crushed stone, thereby reducing drainage and modifying the composition of the surface layer, or at least that portion which is closest to the crushed stone. Suitable separator materials are chosen based on the particle size of the surface composition, its durability and its resistance to deterioration. Any material is satisfactory so long as it allows water to pass through it, while blocking the passage of any particulate matter.

The compositions of the present invention advantageously comprise the following ingredients in the stated ranges by weight, based on the total weight of each composition, although volume measurements will also work.

| Ingredients | Percent by Weight | Preferred Percent by Weight | Most Preferred Percent by Weight |
|---|---|---|---|
| Sand | 40–65 | 48–56 | 51–53 |
| Chopped Polyolefin Fiber | 3–15 | 5–10 | 7–8 |
| Polyolefin Particle | 7.5–22.5 | 12–18 | 14–16 |
| Non-metallic/tire Fiber | 7.5–22.5 | 12–18 | 14–16 |
| Petroleum Wax | 5–17.5 | 8–12 | 9–11 |

The sand employed in the above composition can be of any common type or grade, such as silica sand, with the choice determined by availability and cost. In a preferred embodiment, the sand should be pre-heated to dry it before the mixing step because too much moisture in the sand can reduce the capability of the wax to coat the sand. The average particle size (in diameter) of the sand may vary widely, but it is preferred that the sand will pass substantially through a number 7 U.S. mesh screen while being retained substantially on a number 200 U.S. mesh screen.

The polyolefin fibers which are useful in the practice of this invention comprise a variety of chopped and/or cut synthetic fibers of, for example, low carbon chain high and/or low density polyolefins such as polyethylene, polypropylene and/or copolymers thereof These fibers are commercially available from a variety of sources. They may be straight or curly and typically range in length from about ¼ to 2 inches, preferably ½ to 1½ inches, and range in thickness from about 1/24 to ¼ inches, preferably 1/16 to ⅛ inches. One such useful fiber is sold under the designation Sport Grids® (see Example 1) and another type (available from the same company) is available under the trade name Turf Grids®. Optionally, other suitable fibers may also be used in lieu of or in combination with the polyolefin fibers and their selection is commonly dependent upon cost and availability, such as wood and polyvinylchloride fibers.

The polyolefin particles used in the present invention advantageously include low carbon chain polyolefins such as high and/or low density polyethylene, polypropylene, and/or copolymers thereof These particles are typically derived from recycled or scrap plastics which are ground, chopped or otherwise cut into thin coarse particles which range in length from approximately ½ to 1 inches, preferably ⅝ to ⅞ inches, and most preferably ¾ inch. The thin particles are about 1/32 to 1/16 inches thick. The narrowness of these particles is critical and unexpectedly contributes to superior cushion and drainage characteristics to the sport surface. One preferred source of such particles is casings from recycled wire or cable, where the protective casing is separated from the metal wire or cable and then converted into the appropriate particle size. These particles contribute improved resilience and drainage and can be further used to control the color or the sport surface. Using recycled or scrap materials also serves the purpose of manufacturing an environmental friendly product.

The tire fibers and/or cord used in the present invention typically comprise non-metallic reinforcing fibers and/or cord which are readily obtained from the recycling of truck or automobile tires. The fibers and/or cord, which may be made from synthetic or natural materials, are cut to suitable lengths of between about ¼ to 2½ inches, preferably ½ to 1½ inches, and may have small pieces of tire rubber (vulcanized rubber), other elastomeric materials and/or fabric still attached. The tire fibers and/or cord are light-weight, long lasting and soft, which improve the resiliency and the drainage characteristics of the surface. Furthermore, like with the polyolefin particles, using recycled or scrap tire materials promotes the environment.

The present invention further contemplates the use of one or more auxilliary ingredients, where convenient and as needed, such as ash, silt, clay, fillers, natural fibers, odorants, colorants, cord derived from sources other than tires and other suitable elastomeric materials. These auxilliaries may be used in amounts of up to 50 percent by weight, based on the total weight of the composition. The final product is strong, stable, and inert to biological degration and naturally occurring chemicals, alkalis and acids.

EXAMPLE

The composition of this example is prepared from the following ingredients to provide the following percents by weight in the final particulate product:

| Ingredients | Percent by Weight |
|---|---|
| Sand | 52.0 |
| Polypropylene fibers | 7.5 |
| Polyethylene particles | 15.0 |
| Tire fibers | 15.0 |
| Petroleum wax | 10.5 |

The sand employed in the example is No. 2 mason sand of medium consistency. The screen size analysis (by weight) is as follows (U.S. Mesh Screen): 100% through No. 8, 99.7% through No. 10, 97.6% through No. 30, 55.9% through No. 50, 9.2% through No. 100 and 10% through No. 200. The sand is pre-heated to drive off essentially all residual moisture until it appears dry and free flowing.

The polypropylene fibers used in this example are obtained from Stabilizer, Inc., Phoenix, Ariz., under the trade name Sport Grids®. These fibers are essentially uniform fibers of polypropylene of about ½ to 1¼ inches in length and about 1/16 to ⅛ inches in thickness.

The polyethylene particles used in this example are particulate plastic casings from recycled wiring, with the wire removed. The polyethylene casing is ground to a particle size of approximately ¾ inch long and 1/24 inch thick.

The tire fiber utilized in this example is recycled fiber from used ballast tires with small pieces of tire rubber attached. The fiber is approximately ¾ to 1½ inches in length with a width of about 1/16 to ⅛ inches.

The sand, polypropylene fibers, polyethylene particles and tire fibers are thoroughly mixed together to form an intimate and essentially uniform mixture of essentially dry ingredients.

The petroleum hydrocarbon wax used in this example is heated and melted to above 200° F. The melted (liquified) wax is then intimately mixed with the remaining ingredients to coat them. The wax is characterized as a paraffin wax derived from petroleum by-products. It is dark brown to black in color, has a specific gravity of 0.86, essentially no volatiles, a melting point of 130–155° F. and is insoluble in water. Mixing is continued until essentially all of the particulate ingredients are covered with a thin wax coating.

The mixture is then cooled while mixing, and the wax is allowed to solidify. When cooled, some of the particulate materials may stick together, but they are easily broken up into smaller particulates either by hand or mechanically. The resulting mixture is then deposited over a bed of crushed stone which is approximately 6 inches in thickness (for drainage purposes). The mixture is applied to form a substantially uniform layer having a thickness of about 5 to 6 inches. Thus, the whole sport surface (top layer over crushed stone layer) is about 10 to 13 inches thick. Before depositing the mixture of the invention over the crushed stone, a textile separator (e.g., Geotextile) is advantageously placed over the stone to keep the sand and other particulate material from filtering down into the stone area.

The resulting surface is elegantly suited, for example, as a stable, weather resistant artificial horse racing or equestrian track providing easy drainage, low dust, ease of maintenance and excellent cushioning. In fact, the combination of the resilience of the track and its drainage is superior to any other similar type of track on the market. The surface can also be used for exercise yards, show rings, and other locations where the characteristics of the disclosed invention are desired.

Although the invention has been described with a certain degree of particularity, it is understood that the present invention has been made only by way of example and that numerous changes in the details of construction and the combination and arrangement of parts may be resorted to without departing from the spirit and scope of the invention.

What I claim is:

1. A particulate composition for use as a sport or recreational surface comprising:
   A. about 40–86 percent by weight of sand,
   B. about 5–20 percent by weight of a hydrocarbon wax, and
   C. about 5–50 percent by weight of a fiber, wood, particle, and/or cord selected from the group consisting of: (i) about 3–15 percent by weight of a polyolefin fiber, a polyvinyl chloride fiber, wood, or a mixture thereof, (ii) about 7.5–22.5 percent by weight of a polyolefin particle, (iii) about 7.5–22.5 percent by weight of a tire fiber, a tire cord, or a mixture thereof, and (iv) a mixture of components (i) and (ii), (ii) and (iii), (i) and (ii), or (i), (ii) and (iii), the percent by weight of each ingredient being based on the total weight of the composition.

2. The composition of claim 1, wherein at least two of components (i), (ii) and (iii) are present.

3. A sport or recreational surface comprising at least about a 4 inch layer of the composition of claim 1, which is substantially and uniformly spread over an underlayer capable of drawing water away from the composition.

4. The surface of claim 3, wherein a water-permeable separator layer is placed between the composition and the underlayer.

5. The surface of claim 3, wherein the underlayer comprises an aggregate layer.

6. The surface of claim 5, wherein the aggregate layer is crushed or broken gravel, stone, quarry, granite, limestone fine, dust, or a mixture thereof.

7. The composition of claim 1, wherein the polyolefin fiber is a chopped and/or cut synthetic polyethylene fiber, a polypropylene fiber, a copolymer of a polyethylene or polypropylene fiber, or a mixture thereof.

8. The composition of claim 1, wherein the polyolefin particle is a polyethylene particle, a polypropylene particle, a copolymer of polyethylene or polypropylene particle, or a mixture thereof.

9. The composition of claim 8, wherein the polyolefin particle is prepared from a recycled or scrap plastic.

10. The composition of claim 1, wherein the polyolefin particle is about ½ to 1 inch long and 1/32 to 1/16 inch thick.

11. The composition of claim 1, wherein the tire fiber and/or cord is non-metallic.

12. The composition of claim 1, further comprising up to about 50 percent by weight of one or more auxiliary ingredients.

13. A particulate composition for use as a sport or recreational surface comprising about 40–65 percent by weight of sand, about 3–15 percent by weight of a polyolefin fiber, optionally the polyolefin fiber being partly or wholly replaced by a polyvinyl chloride fiber or wood, about 7.5–22.5 percent by weight of a polyolefin particle, about 7.5–22.5 percent by weight of a tire fiber or cord, and about 5–17.5 percent by weight of a hydrocarbon wax, the wax being present in a form of a substantially uniform and thin coating on the ingredients of the composition, the percent by weight of each ingredient being based on the total weight of the composition.

14. A sport or recreational surface comprising at least about a 4 inch layer of the composition of claim 13, which is substantially and uniformly spread over an underlayer capable of drawing water away from the composition.

15. The surface of claim 14, wherein a water-permeable separator layer is placed between the composition and the underlayer.

16. The composition of claim 13, wherein the ingredients are present in the following approximate percents by weight, based on the total weight of the composition:

| Ingredients | Percent by Weight |
| --- | --- |
| Sand | 48–56 |
| Polyolefin fibers | 5–10 |
| Polyolefin Particles | 12–18 |
| Tire Fibers | 12–18 |
| Wax | 8–12 |

17. A method of making a sport or recreational surface, the method comprising the steps of:
   (a) admixing about 40–86 percent by weight of sand and at least one of: (i) about 3–15 percent by weight of a polyolefin fiber, a polyolefin chloride fiber, wood or a mixture thereof, (ii) about 7.5–22.5 percent by weight of a polyolefin particle, and (iii) about 7.5–22.5 percent by weight of a tire fiber, a tire cord, or a mixture of the tire fiber and cord;
   (b) heating about 5–20 percent by weight of a hydrocarbon wax until the wax has liquified;
   (c) admixing the liquid wax into the mixture of step (a) to form a wax coated particulate composition, the percent by weight of each ingredient being based on the total weight of the composition;
   (d) cooling the particulate composition of step (c);
   (e) optionally, breaking up the particulate composition into smaller particulates by hand or mechanically; and
   (f) depositing the cooled composition of steps (d) or (e) over an underlayer which is capable of drawing water away from an area.

18. The method of claim 17, further comprising the step of placing a separator layer between the composition and the underlayer.

19. The method of claim 17, further comprising the step of pre-heating the sand before mixing it with the other ingredients.

20. A sport or recreational surface prepared according to the method of claim 17.

* * * * *

UNITED STATES PATENT AND TRADEMARK OFFICE
CERTIFICATE OF CORRECTION

PATENT NO.: 5,961,389

DATED: October 5, 1999

INVENTOR(S): Michael W. Dickinson

It is certified that error appears in the above-identified patent and that said Letters Patent is hereby corrected as shown below:

In claim 1, in the 8$^{th}$ line of subheading (C), (column 7, line 39), change the second occurrence of "(i) and (ii)" to - - (i) and (iii) - -.

Signed and Sealed this

Fourth Day of April, 2000

*Attest:*

Q. TODD DICKINSON

*Attesting Officer*  *Director of Patents and Trademarks*